US010724564B2

(12) United States Patent
Derelöv (10) Patent No.: US 10,724,564 B2
(45) Date of Patent: Jul. 28, 2020

(54) SET OF PANELS WITH A MECHANICAL LOCKING DEVICE (71) Applicant: Valinge Innovation AB, Viken (SE)

(72) Inventor: Peter Derelöv, Helsingborg (SE)

(73) Assignee: VALINGE INNOVATION AB, Viken (SE)

(*) Notice: Subject to any disclaimer, the term of this patent is extended or adjusted under 35 U.S.C. 154(b) by 134 days.

(21) Appl. No.: 15/794,491

(22) Filed: Oct. 26, 2017

(65) Prior Publication Data
US 2018/0119717 A1 May 3, 2018

(30) Foreign Application Priority Data

Oct. 27, 2016 (SE) ...................................... 1651409

(51) Int. Cl.
F16B 12/00 (2006.01)
F16B 12/12 (2006.01)
(Continued)

(52) U.S. Cl.
CPC ........ *F16B 12/125* (2013.01); *A47B 47/0075* (2013.01); *A47B 96/201* (2013.01);
(Continued)

(58) Field of Classification Search
CPC ........ F16B 12/125; F16B 12/26; F16B 12/24; A47B 2230/0081; A47B 2230/12;
(Continued)

(56) References Cited

U.S. PATENT DOCUMENTS 291,032 A 1/1884 Cleland
634,581 A 10/1899 Miller
(Continued)

FOREIGN PATENT DOCUMENTS

CH 365507 A * 11/1962 .............. F16B 12/24
CH 685 276 A5 5/1995
(Continued)

OTHER PUBLICATIONS

U.S. Appl. No. 14/486,681, Hans Brännstöm, Agne Pålsson and Peter Derelöv filed Sep. 15, 2014 (Cited herein as US Patent Publication No. 2015/0078807 A1 of Mar. 19, 2015).
(Continued)

Primary Examiner — Matthew R McMahon
(74) Attorney, Agent, or Firm — Buchanan Ingersoll & Rooney P.C.

(57) ABSTRACT

A set including a first panel, a second panel and a mechanical locking device for locking the first panel to the second panel. The first panel includes a first edge surface and a first panel surface, and the second panel includes a second edge surface and a second panel surface. The first edge surface is facing the second panel surface in a locked position of the first and the second panel. The mechanical locking device includes a rod-shaped element at the first edge surface and an insertion groove at the second panel surface and an edge groove at the second edge surface and a flexible tongue positioned in the edge groove. The rod-shaped element includes a recess and is configured to be inserted into the insertion groove. The flexible tongue is configured to cooperate with the recess for a locking of the first panel to the second panel.

18 Claims, 8 Drawing Sheets (51) Int. Cl.
  *F16B 12/26* (2006.01)
  *F16B 12/24* (2006.01)
  *A47B 47/00* (2006.01)
  *A47B 96/20* (2006.01)

(52) U.S. Cl.
  CPC .............. *F16B 12/24* (2013.01); *F16B 12/26* (2013.01); *A47B 2230/0081* (2013.01); *Y10T 403/4602* (2015.01); *Y10T 403/7073* (2015.01)

(58) Field of Classification Search
  CPC . A47B 47/0075; A47B 96/201; A47B 88/423; A47B 88/43; Y10T 403/4602; Y10T 403/7073
  See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,765,465 A | 10/1973 | Gulistan |
| 3,784,271 A | 1/1974 | Schreiber |
| 3,884,002 A * | 5/1975 | Logie .................. E04B 1/6162 312/263 |
| 3,885,845 A | 5/1975 | Krieks |
| 3,981,118 A | 9/1976 | Johnson et al. |
| 4,089,614 A | 5/1978 | Harley |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A * | 11/1981 | Bertschi ............... E04B 1/6162 403/296 |
| 4,308,961 A | 1/1982 | Kunce |
| 4,324,517 A | 4/1982 | Dey |
| 4,403,886 A | 9/1983 | Hauesler |
| 4,405,253 A * | 9/1983 | Stockum ............. F16B 12/2027 108/158 |
| 4,509,648 A | 4/1985 | Govang |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,561 A | 3/1990 | Haheeb |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,360,121 A | 11/1994 | Sothman |
| 5,375,802 A | 12/1994 | Branham, II |
| 5,423,155 A | 6/1995 | Bauer |
| 5,451,102 A * | 9/1995 | Chuan .................... F16B 12/14 312/257.1 |
| 5,471,804 A * | 12/1995 | Winter, IV ............... E04B 1/14 403/231 |
| 5,475,960 A | 12/1995 | Lindal |
| 5,499,886 A | 3/1996 | Short et al. |
| 5,527,103 A | 6/1996 | Pittman |
| 5,658,086 A | 8/1997 | Brokaw et al. |
| 5,711,115 A | 1/1998 | Wirt |
| 5,775,521 A | 7/1998 | Tisbo |
| 5,810,505 A * | 9/1998 | Henriott ................. F16B 12/14 108/153.1 |
| 5,893,617 A | 4/1999 | Lee |
| 5,944,294 A | 8/1999 | Baer |
| 5,950,389 A | 9/1999 | Porter |
| 6,050,426 A | 4/2000 | Leurdijk |
| 6,142,436 A | 11/2000 | Thurston et al. |
| 6,312,186 B1 | 11/2001 | Röck et al. |
| 6,363,645 B1 | 4/2002 | Hunter |
| 6,413,007 B1 | 7/2002 | Lambright |
| 6,491,172 B2 | 12/2002 | Chance |
| 6,505,452 B1 | 1/2003 | Hannig |
| 6,547,086 B1 | 4/2003 | Harvey |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 * | 5/2007 | Migli .................. F16B 12/2009 29/452 |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 * | 6/2013 | Hazzard ................. F16B 12/24 24/706.5 |
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 * | 5/2014 | Pervan ................... E04F 15/02 52/582.2 |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |

(56) References Cited

U.S. PATENT DOCUMENTS

| | | |
|---|---|---|
| 8,864,407 B1 | 10/2014 | Sorum |
| 8,887,468 B2 | 11/2014 | Håkansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 * | 8/2019 | Broughton ............ F16B 12/24 |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 2002/0170258 A1 | 11/2002 | Schwitte et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0173122 A1 | 7/2010 | Susnjara |
| 2010/0289389 A1 | 11/2010 | Crabtree, II |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0202160 A1 | 7/2018 | Derelöv |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |

FOREIGN PATENT DOCUMENTS

| | | | |
|---|---|---|---|
| CH | 696 889 A5 | 1/2008 | |
| CH | 698 988 B1 | 12/2009 | |
| CN | 101099618 A | 1/2008 | |
| CN | 203424576 U | 2/2014 | |
| DE | 26 35 237 A | 2/1978 | |
| DE | 31 03 281 A1 | 8/1982 | |
| DE | 298 20 031 U1 | 2/1999 | |
| DE | 20 2008 011 589 U1 | 11/2008 | |
| DE | 20 2009 008 825 U1 | 10/2009 | |
| DE | 102008035293 A1 * | 2/2010 | ......... A47B 47/0075 |
| DE | 10 2009 041 142 A1 | 3/2011 | |
| DE | 10 2014 110 124 A1 | 1/2016 | |
| EP | 0 060 203 A2 | 9/1982 | |
| EP | 0 060 203 A3 | 9/1982 | |
| EP | 0 362 968 A | 4/1990 | |
| EP | 0 675 332 A2 | 10/1995 | |
| EP | 0 871 156 A2 | 10/1998 | |
| EP | 0 935 076 A1 | 8/1999 | |
| EP | 1 048 423 A2 | 11/2000 | |
| EP | 1 048 423 B9 | 5/2005 | |
| EP | 1 650 375 A1 | 4/2006 | |
| EP | 1 671 562 A1 | 6/2006 | |
| EP | 1 650 375 A8 | 9/2006 | |
| EP | 1 863 984 A1 | 12/2007 | |
| EP | 1 922 954 A1 | 5/2008 | |
| EP | 2 017 403 A2 | 1/2009 | |
| EP | 2 037 128 A1 | 3/2009 | |
| EP | 1 922 954 B1 | 7/2009 | |
| EP | 2 333 353 A2 | 6/2011 | |
| EP | 1 863 984 B1 | 11/2011 | |
| EP | 2 487 373 A1 | 8/2012 | |
| EP | 3 031 998 A1 | 6/2016 | |
| FR | 2 062 731 A5 | 6/1971 | |
| FR | 2 517 187 A1 | 6/1983 | |
| FR | 2 597 173 A1 | 10/1987 | |
| FR | 2 602 013 A1 | 1/1988 | |
| GB | 1 022 377 A | 3/1966 | |
| GB | 2 482 213 A | 1/2012 | |

(56) References Cited

FOREIGN PATENT DOCUMENTS

| | | | |
|---|---|---|---|
| GB | 2 520 927 A | 6/2015 | |
| JP | 2003-239921 A | 8/2003 | |
| KR | 10-1147274 B1 | 5/2012 | |
| KR | 2014-0042314 A | 4/2014 | |
| WO | WO 87/07339 A1 | 12/1987 | |
| WO | WO 99/22150 A1 | 5/1999 | |
| WO | WO 00/66856 A1 | 11/2000 | |
| WO | WO 01/02669 A1 | 1/2001 | |
| WO | WO 01/02670 A1 | 1/2001 | |
| WO | WO 01/51733 A1 | 7/2001 | |
| WO | WO 01/53628 A1 | 7/2001 | |
| WO | WO 02/055809 A1 | 7/2002 | |
| WO | WO 02/055810 A1 | 7/2002 | |
| WO | WO 03/016654 A1 | 2/2003 | |
| WO | WO 03/027510 A2 | 4/2003 | |
| WO | WO 03/083234 A1 | 10/2003 | |
| WO | WO 2004/079130 A1 | 9/2004 | |
| WO | WO 2005/068747 A1 | 7/2005 | |
| WO | WO 2006/043893 A1 | 4/2006 | |
| WO | WO 2006/103500 A1 | 10/2006 | |
| WO | WO 2006/104436 A1 | 10/2006 | |
| WO | WO 2007/015669 A2 | 2/2007 | |
| WO | WO 2007/015669 A3 | 2/2007 | |
| WO | WO 2007/079845 A1 | 7/2007 | |
| WO | WO 2008/004960 A2 | 1/2008 | |
| WO | WO 2008/004960 A3 | 1/2008 | |
| WO | WO 2008/004960 A8 | 1/2008 | |
| WO | WO 2008/017281 A1 | 2/2008 | |
| WO | WO 2008/017301 A2 | 2/2008 | |
| WO | WO 2008/017301 A3 | 2/2008 | |
| WO | WO 2008/150234 A1 | 12/2008 | |
| WO | WO 2010/023042 A1 | 3/2010 | |
| WO | WO 2010/070472 A2 | 6/2010 | |
| WO | WO 2010/070472 A3 | 6/2010 | |
| WO | WO 2010/070605 A2 | 6/2010 | |
| WO | WO 2010/070605 A3 | 6/2010 | |
| WO | WO 2010/082171 A2 | 7/2010 | |
| WO | WO 2010/087752 A1 | 8/2010 | |
| WO | WO 2011/012104 A2 | 2/2011 | |
| WO | WO 2011/012104 A3 | 2/2011 | |
| WO | WO 2011/086710 A1 | 7/2011 | |
| WO | WO 2011/151737 A2 | 12/2011 | |
| WO | WO 2011/151737 A3 | 12/2011 | |
| WO | WO 2011/151737 A9 | 12/2011 | |
| WO | WO 2011/151758 A2 | 12/2011 | |
| WO | WO 2011/151758 A3 | 12/2011 | |
| WO | WO 2012/095454 A1 | 7/2012 | |
| WO | WO 2012/154113 A1 | 11/2012 | |
| WO | WO 2013/009257 A1 | 1/2013 | |
| WO | WO 2013/025163 A1 | 2/2013 | |
| WO | WO 2013/080160 A1 | 6/2013 | |
| WO | WO 2013/093636 A2 | 6/2013 | |
| WO | WO 2013/093636 A3 | 6/2013 | |
| WO | WO 2013/118075 A1 | 8/2013 | |
| WO | WO 2014/072080 A1 | 5/2014 | |
| WO | WO 2014/108114 A1 | 7/2014 | |
| WO | WO 2014/121410 A1 | 8/2014 | |
| WO | WO 2015/015603 A1 | 2/2015 | |
| WO | WO 2015/038059 A1 | 3/2015 | |
| WO | WO 2015/105449 A1 | 7/2015 | |
| WO | WO 2015/105450 A1 | 7/2015 | |
| WO | WO 2015/105451 A1 | 7/2015 | |
| WO | WO 2017/131574 A1 | 8/2017 | |
| WO | WO 2017/135874 | 8/2017 | |
| WO | WO 2018/080387 A1 | 5/2018 | |

OTHER PUBLICATIONS

U.S. Appl. No. 14/573,572, Christian Boo, filed Dec. 17, 2014 (Cited herein as US Patent Publication No. 2015/0198191 A1 of Jul. 16, 2015).
U.S. Appl. No. 15/271,622, Peter Derelöv and Mats Nilsson, filed Sep. 21, 2016 (Cited herein as US Patent Publication No. 2017/0079433 A1 of Mar. 23, 2017).
U.S. Appl. No. 15/308,872, Darko Pervan, filed Nov. 4, 2016 (Cited herein as US Patent Application Publication No. 2017/0089379 A1 of Mar. 30, 2017).
U.S. Appl. No. 15/379,791, Niclas Håkansson and Darko Pervan, filed Dec. 15, 2016 (Cited herein as US Patent Application Publication No. 2017/0097033 A1 of Apr. 6, 2017).
U.S. Appl. No. 15/415,356, Peter Derelöv and Christian Boo, filed Jan. 25, 2017 (Cited herein as US Patent Application Publication No. 2017/0208938 A1 of Jul. 27, 2017).
U.S. Appl. No. 15/422,798, Magnus Fridlund, filed Feb. 2, 2017 (Cited herein as US Patent Application Publication No. 2017/0227035 A1 of 10 Aug. 2017).
U.S. Appl. No. 15/428,469, Magnus Fridlund, filed Feb. 9, 2017 (Cited herein as US Patent Application Publication No. 2017/0227032 A1 of Aug. 10, 2017).
U.S. Appl. No. 15/428,504, Christian Boo, filed Feb. 9, 2017 (Cited herein as US Patent Application publication No. 2017/0227031 A1 of Aug. 10, 2017).
U.S. Appl. No. 15/432,190, Magnus Fridlund, filed Feb. 14, 2017 (Cited herein as US Patent Application Publication No. 2017/0234346 A1 of Aug. 17, 2017).
U.S. Appl. No. 15/642,757, Peter Derelöv, filed Jul. 6, 2017 (Cited herein as US Patent Application Publication No. 2017/0298973 A1 of Oct. 19, 2017).
U.S. Appl. No. 15/646,714, Peter Derelöv, filed Jul. 11, 2017 (Cited herein as US Patent Application Publication No. 2018/0087552 A1 of Mar. 29, 2018).
U.S. Appl. No. 15/562,254, Peter Derelöv, filed Sep. 27, 2017 (Cited herein as US Patent Application Publication No. 2018/0080488 A1 of Mar. 22, 2018).
U.S. Appl. No. 15/567,507, Christian Boo, Peter Derelöv and Agne Pålsson, filed Oct. 18, 2017 (Cited herein as US Patent Application Publication No. 2018/0112695 A1 of Apr. 26, 2018).
U.S. Appl. No. 15/923,701, Peter Derelöv, filed Mar. 16, 2018.
U.S. Appl. No. 15/956,949, Peter Derelöv, filed Apr. 19, 2018.
U.S. Appl. No. 15/978,630, Jonas Fransson, Niclas Håkansson and Agne Pålsson, filed May 14, 2018.
U.S. Appl. No. 16/020,479, Christian Boo and Peter Derelöv, filed Jul. 5, 2018.
U.S. Appl. No. 15/923,701, Derelöv.
U.S. Appl. No. 15/956,949, Derelöv.
U.S. Appl. No. 15/978,630, Fransson, et al.
U.S. Appl. No. 16/027,479, Boo, et al.
International Search Report/Written Opinion dated Dec. 18, 2017 in PCT/SE2017/051053, ISA/SE, Patent-och registreringsverket, Stockholm, SE, 12 pages.
Derelöv, Peter, U.S. Appl. No. 15/923,701 entitled "Panels Comprising a Mechanical Locking Device and an Assembled Product Comprising the Panels", filed Mar. 16, 2018.
Derelov, Peter, U.S. Appl. No. 15/956,949 entitled "Panels for an Assembled Product", filed Apr. 19, 2018.
Fransson, Jonas, et al., U.S. Appl. No. 15/978,630 entitled "Elements and a Locking Device for an Assembled Product," filed May 14, 2018.
Boo, Christian, et al., U.S. Appl. No. 16/027,479 entitled "Panels Comprising a Mechanical Locking Device and an Assembled Product Comprising the Panels," filed Jul. 5, 2018.
U.S. Appl. No. 16/228,975, Niclas Håkansson and Darko Pervan, filed Dec. 21, 2018 (Cited herein as US Patent Application Publication No. 2019/0113061 A1 of Apr. 18, 2019).
U.S. Appl. No. 16/220,574, Peter Derelöv, filed Dec. 14, 2018.
U.S. Appl. No. 16/220,585, Peter Derelöv, filed Dec. 14, 2018.
U.S. Appl. No. 16/361,609, Peter Derelöv, Johan Svensson and Lars Gunnarsson, filed Mar. 22, 2019.
U.S. Appl. No. 16/386,732, Christian Boo, filed Apr. 17, 2019.
U.S. Appl. No. 16/386,810, Christian Boo, filed Apr. 17, 2019.
U.S. Appl. No. 16/386,824, Christian Boo, filed Apr. 17, 2019.
U.S. Appl. No. 16/386,874, Peter Derelöv, filed Apr. 17, 2019.
U.S. Appl. No. 16/220,574, Derelöv.
U.S. Appl. No. 16/220,585, Derelöv.
U.S. Appl. No. 16/361,609, Derelöv.
U.S. Appl. No. 16/386,732, Boo.
U.S. Appl. No. 16/386,810, Boo.

(56) References Cited

OTHER PUBLICATIONS

U.S. Appl. No. 16/386,824, Boo.
U.S. Appl. No. 16/386,874, Derelöv.
Derelöv, Peter, U.S. Appl. No. 16/220,574 entitled "Set of Panels," filed Dec. 14, 2018.
Derelöv, Peter, U.S. Appl. No. 16/220,585 entitled "Set of Panels," filed Dec. 14, 2018.
Derelöv, Peter, et al., U.S. Appl. No. 16/361,609 entitled "Panels Comprising a Mechanical Locking Device and an Assembled Product Comprising the Panels," filed Mar. 22, 2019.
Boo, Christian, U.S. Appl. No. 16/386,732 entitled "Set of Panels With a Mechanical Locking Device," filed Apr. 17, 2019.
Boo, Christian, U.S. Appl. No. 16/386,810 entitled "Set of Panels With a Mechanical Locking Device," filed Apr. 17, 2019.
Boo, Christian, U.S. Appl. No. 16/386,824 entitled "Set of Panels With a Mechanical Locking Device," filed Apr. 17, 2019.
Derelöv, Peter, U.S. Patent Application No. 16/386,874 entitled "Symmetric Tongue and T-Cross," filed Apr. 17, 2019.
U.S. Appl. No. 16/703,077, Fridlund.
U.S. Appl. No. 16/722,096, Derelöv et al.
Fridlund, Magnus, U.S. Appl. No. 16/703,077 entitled "Set of Panels for an Assembled Product," filed Dec. 4, 2019.
Derelöv, Peter, et al., U.S. Appl. No. 16/722,096 entitled "Panels Comprising a Mechanical Locking Device and an Assembled Product Comprising the Panels," filed Dec. 20, 2019.
U.S. Appl. No. 16/553,325, Derelöv et al.
U.S. Appl. No. 16/553,350, Derelöv et al.
U.S. Appl. No. 16/564,438, Brännström et al.
U.S. Appl. No. 16/567,436, Derelöv.
U.S. Appl. No. 16/663,603, Fridlund.
U.S. Appl. No. 16/697,335, Boo et al.
Derelöv, Peter, U.S. Appl. No. 16/553,325 entitled "Set of Panels with a Mechanical Locking Device," filed Aug. 28, 2019.
Derelöv, Peter, U.S. Appl. No. 16/553,350 entitled "Set of Panels with a Mechanical Locking Device," filed Aug. 28, 2019.
Brännström, Hans, et al., U.S. Appl. No. 16/564,438 entitled "Assembled Product and a Method of Assembling the Assembled Product," filed Sep. 9, 2019.
Derelöv, Peter, U.S. Appl. No. 16/567,436 entitled "Panels Comprising a Mechanical Locking Device and an Assembled Product Comprising the Panels," filed Sep. 11, 2019.
Fridlund, Magnus, U.S. Appl. No. 16/663,603 entitled "Element and Method for Providing Dismantling Groove," filed Oct. 25, 2019.
Boo, Christian, et al., U.S. Appl. No. 16/697,335 entitled "Panels Comprising a Mechanical Locking Device and an Assembled Product Comprising the Panels," filed Nov. 27, 2019.
Extended European Search Report issued in EP Application No. 17863769.0, dated Feb. 27, 2020, European Patent Office, Munich, DE, 7 pages.
**Derelöv, Peter, U.S. Appl. No. 16/861,639 entitled "Panels Comprising a Mechanical Locking Device and an Assembled Product Comprising the Panels," filed in the U.S. Patent and Trademark Office on Apr. 29, 2020.

* cited by examiner

SET OF PANELS WITH A MECHANICAL LOCKING DEVICE

CROSS REFERENCE TO RELATED APPLICATIONS

The present application claims the benefit of Swedish Application No. SE 1651409-3, filed on Oct. 27, 2016. The entire contents of Swedish Application No. SE 1651409-3 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component. The locking device may comprise a flexible tongue.

TECHNICAL BACKGROUND

A furniture product provided with a mechanical locking device is known in the art, as evidenced by WO2015/038059. The furniture product comprises a first panel connected perpendicular to a second panel by a mechanical locking device comprising a flexible tongue in an insertion groove.

The above description of various known aspects is the applicant's characterization of such, and is not an admission that any of the above description is considered as prior art.

SUMMARY

It is an object of certain embodiments of the present invention to provide an improvement over the above described techniques and known art; particularly, to reduce the size of the insertion groove at the second panel surface of the second panel. The reduced size may have the advantage of an increased locking strength.

At least some of these and other objects and advantages that will be apparent from the description have been achieved by a first aspect of the invention that includes a set comprising a first panel, a second panel and a mechanical locking device for locking the first panel to the second panel. The first panel comprises a first edge surface and a first panel surface. The second panel comprises a second edge surface and a second panel surface. The first edge surface is facing the second panel surface in a locked position of the first and the second panel. The mechanical locking device comprises a rod-shaped element at the first edge surface and an insertion groove at the second panel surface. The mechanical locking device further comprises an edge groove at the second edge surface and a flexible tongue positioned in the edge groove. The rod-shaped element comprises a recess. The rod-shaped element is configured to be inserted into the insertion groove, and the flexible tongue is configured to cooperate with the recess for a locking of the first panel to the second panel in a first direction which is perpendicular to the second panel surface.

A locking surface of the flexible tongue may cooperate with a locking surface of the recess for the locking of the first panel to the second.

The insertion groove may be formed in the second panel surface and in a core of the second panel.

The second panel surface may comprise a decorative layer and the insertion groove may extend though the decorative layer.

The insertion groove may be formed by mechanical cutting, such as milling, drilling or sawing.

The rod-shaped element and the insertion groove at the second panel surface may have the advantage that the sizes of the grooves of the locking device are reduced compared to the known mechanical locking devices. An edge element, such as an edge band, is preferably attached to the second edge for covering the edge groove and for enforcing the second edge.

A further advantage may be that the insertion groove may be produced by drilling, which may improve the position of the first panel relative the second panel in the locked position.

The first panel and the second panel are preferably panels for a furniture product and may be a part of a frame of a furniture product.

The set is preferably configured for locking the first panel to the second panel with the first panel surface perpendicular or essentially perpendicular to the second panel surface.

The mechanical locking device is preferably configured to automatically lock the first panel to the second panel when the rod-shaped element is inserted into the insertion groove and the first edge surface is arranged against second panel surface.

The rod-shaped element is preferably configured to cooperate with the insertion groove for a locking of the first panel to the second panel in a second direction which is perpendicular to the first panel surface.

The rod-shaped element is preferably configured to cooperate with the insertion groove for a locking of the first panel to the second panel in a third direction which is perpendicular to the first direction and the second direction.

The rod-shaped element preferably has a longitudinal shape with a length direction which is parallel to the first panel surface.

A first crosscut of the rod-shaped element, in a plane parallel to the second panel surface, may have a circular shape or a rectangular shape.

A second cross cut of the insertion groove, in a plane parallel to the second panel surface, preferably has a shape that matches the first cross cut.

The insertion groove may extend from the second panel surface to the edge groove.

A part of the rod-shaped element, such as an outer surface or an envelope surface of the rod shaped element, may be configured to cooperate, for the locking in the second direction, with side walls of the of the insertion groove.

The sidewalls may comprise material of the core of the second panel.

The insertion groove may be a bottom-ended groove, such as a bottom ended drill hole, comprising a bottom surface which is positioned at a distance from the edge groove.

The insertion groove may have a first part on a first side of the edge groove and a second part on a second side of the edge groove, wherein the second part comprises a bottom surface and side walls, wherein, in a locked position, the rod-shaped element passes through the first part of the insertion groove, through the edge groove and into the second part of the insertion groove.

The rod-shaped element may be configured to cooperate, in a locked position, with the bottom surface.

The first edge surface may comprise two or more of said rod shaped element and the second panel surface may comprise two or more of said insertion groove, preferably arranged linearly, wherein each of the rod-shaped elements is configured to be inserted into one of the insertion grooves.

The edge groove may be formed in the second edge surface and in the core of second panel by e.g. mechanical cutting, such as milling, drilling or sawing.

The edge groove may comprise a circular cross section in a plane parallel to the first panel surface.

The edge groove may be a longitudinal groove that extends in a longitudinal direction of the second edge surface.

The edge groove may extend from the second edge surface to the insertion groove.

The edge groove may be a bottom-ended groove, comprising a bottom surface which is positioned at a distance from the insertion groove.

The flexible tongue is preferably arranged at the bottom surface of the edge groove.

The flexible tongue may be arranged between the recess and the bottom surface of the edge groove in the locked position The rod-shaped element may be configured to be attached in an attachment groove in the first edge surface. An advantage with this embodiment may be that the material waste for the production of the first panel is reduced.

The insertion groove may be adjacent the second edge surface.

The second edge surface may be essentially perpendicular to the second panel surface.

The edge groove may have a length direction extending along the second edge.

The flexible tongue is preferably displaceable in the edge groove.

The flexible tongue may be according to the flexible tongue described and shown in FIGS. 2A-2F in WO2015/105449. FIGS. 2A-2F and the related disclosure from page 6, line 15 to page 7, line 2, in WO2015/105449 are hereby expressly incorporated by reference herein.

The core of the first panel and/or of the second panel may be a wood-based core, preferably made of MDF, HDF, OSB, WPC, plywood or particleboard. The core may also be a plastic core comprising thermosetting plastic or thermoplastic e.g. vinyl, PVC, PU or PET. The plastic core may comprise fillers.

The first panel and/or the second panel may also be of solid wood.

The first panel and/or the second panel may be provided with a decorative layer, such as a foil or a veneer, on one or more surfaces.

BRIEF DESCRIPTION OF THE DRAWINGS

The present invention will by way of example be described in more detail with reference to the appended schematic drawings, which shows embodiments of the present invention.

DETAILED DESCRIPTION

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

A first embodiment of the invention is shown in FIGS. 1A-4B including a set comprising a first panel 1, a second panel 2 and a mechanical locking device for locking the first panel to the second panel. The first panel 1 comprises a first edge surface 12 and a first panel surface 13. The second panel 2 comprises a second edge surface 4 and a second panel surface 3. The first edge surface 12 is facing the second panel surface 3 in a locked position of the first and the second panel. The mechanical locking device comprises a rod-shaped element 8 at the first edge surface 12 and an insertion groove 7 at the second panel surface 3. The mechanical locking device further comprises an edge groove 5 at the second edge surface 4 and a flexible tongue 6 positioned in the edge groove 5. The rod-shaped element 8 comprises a recess 9. The rod-shaped element 8 is configured to be inserted into the insertion groove 7. The flexible tongue 6 is configured to cooperate with the recess 9 for a locking of the first panel 1 to the second panel 2 in a first direction which is perpendicular to the second panel surface 3.

The first panel 1 and the second panel 2 are preferably panels for a furniture product and may be a part of a frame of a furniture product.

The set is preferably configured for locking the first panel 1 to the second panel 2 with the first panel surface 13 perpendicular or essentially perpendicular to the second panel surface 3.

Figures 1A, 1B:
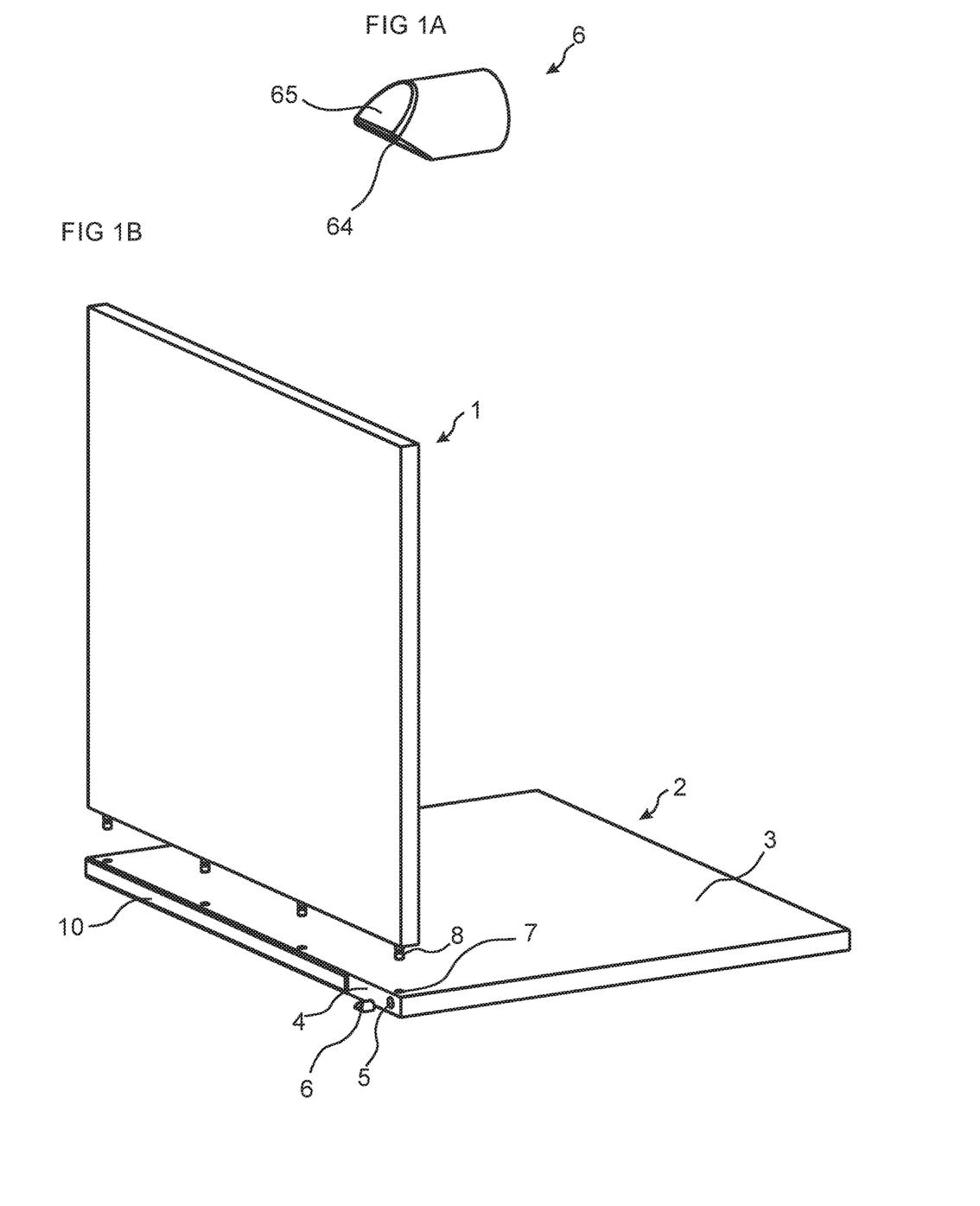
FIG. 1A shows an embodiment of the flexible tongue according to an embodiment of the invention.
FIG. 1B shows a 3D-view of an embodiment of the invention during assembling.

FIG. 1B shows the first embodiment in a 3D view during assembling. The first panel may be assembled by displacing the first panel relative the second panel in a direction which is perpendicular to the second panel surface 3. The mechanical locking device may be configured to automatically lock the first panel 1 to the second panel 2 when the rod-shaped element 8 is inserted into the insertion groove 7 and the first edge surface 12 is arranged against second panel surface 3.

The insertion groove 7 may be formed in the second panel surface 3 and in a core of the second panel 2.

The second panel surface 3 may comprise a decorative layer and the insertion groove may extend though the decorative layer.

The insertion groove may be formed by mechanical cutting, such as drilling.

An edge element 10, such as an edge band, is preferably attached to the second edge for covering the edge groove 5 and for enforcing the second edge 4. The edge element 10 may be glued to the second edge or attached by a mechanical locking device, which may comprise a part that protrudes from the edge element and is configured to be inserted into the edge groove 5. The part may be attached to the edge groove 5 by friction. The edge element is in FIG. 1B partly removed in order to visualize the flexible tongue 6 and the edge groove 5. The flexible tongue 6 is shown before it is positioned in the edge groove 5. The edge groove 5 may comprise a circular cross section.

An embodiment of the flexible tongue 6 is shown in FIG. 1A in a 3D view. The flexible tongue may have an envelope surface which preferably matches the circular cross section of the edge groove 5. A first part of the flexible tongue is configured to cooperate with the insertion groove and a second part is configured to cooperate with the recess 9 of the rod-shaped element 8. An advantage with this embodiment of the flexible tongue is that the size of the edge groove may be small. A small edge groove may have the advantage that the effect of the strength of the second edge of the second panel is limited or non-existent.

The second part may comprise a first bevel 65 which configured to cooperate with the rod-shaped element 8 during assembling and a second bevel 64 which is configured to cooperate with the recess for the locking.

The flexible tongue may comprise a flexible material to enable compression and a displacement of the flexible tongue in the edge groove during assembling.

The flexible tongue may comprise an element which is flexible to enable compression and a displacement of the flexible tongue in the edge groove during assembling and another element which is less flexible in order to improve the locking strength.

A part of the envelope surface of the flexible tongue 6 may be configured to be displaced against a surface, such as a cylindrical surface, of the edge groove 5.

The first edge surface 12 may comprise two or more of said rod shaped element and the second panel surface 3 may comprise two or more of said insertion groove 7, preferably arranged linearly, wherein each of the rod-shaped elements is configured to be inserted into one of the insertion grooves.

Figure 2A:
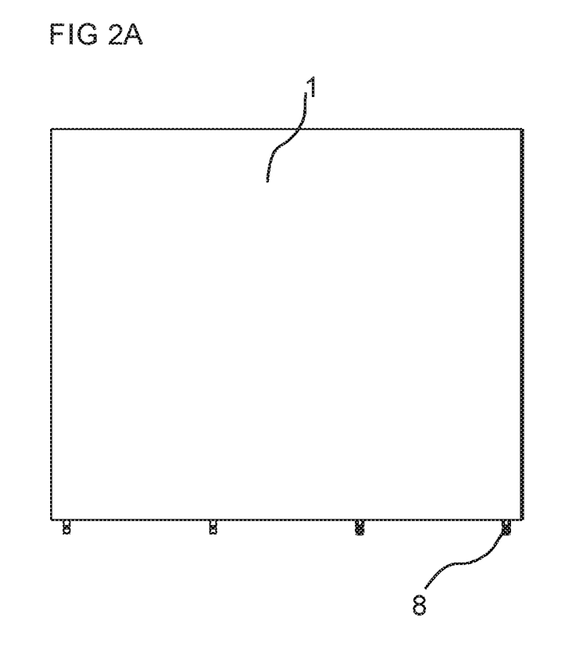
FIGS. 2A-2B show side views of an embodiment of the first panel according to an embodiment of the invention.
Figure 2B:
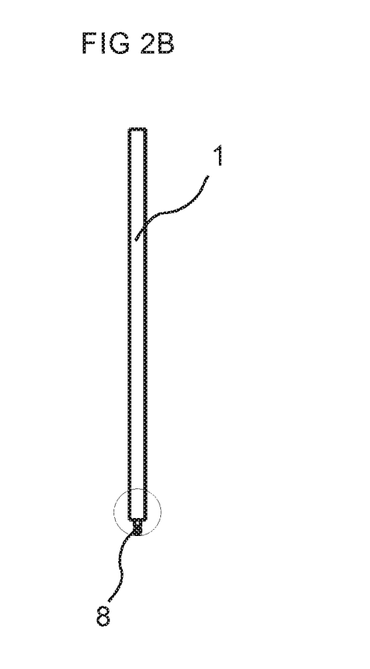
Figure 2C:
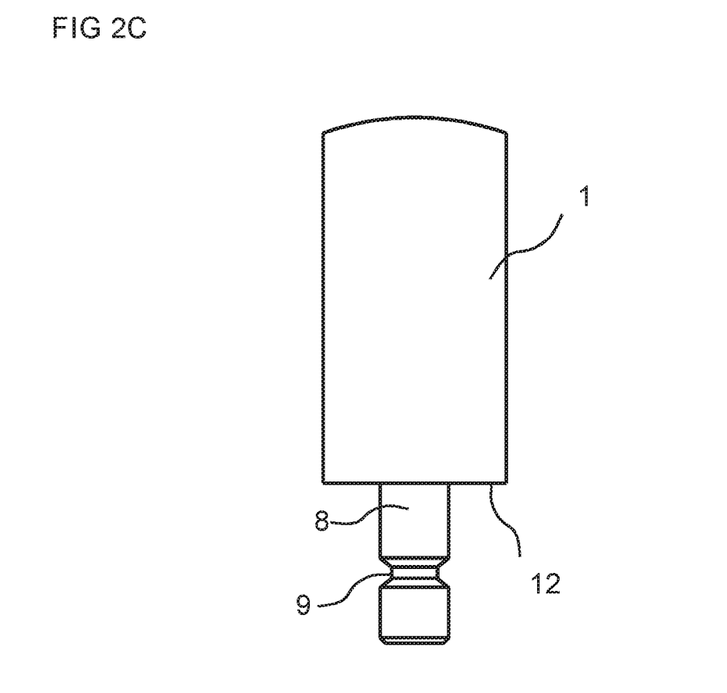
FIG. 2C shows an enlargement of a part of the embodiment shown in FIG. 2B.

FIG. 2A shows a first side view of the first panel 1 and FIG. 2B shows a second side view of the first panel 1. FIG. 2C shows an enlargement of the encircled area indicated in FIG. 2B. 4. An embodiment of the rod-shaped element 8 is shown which comprises an embodiment of the recess 9. The rod-shaped element has a longitudinal shape with a length direction which is parallel to the first panel surface. A first crosscut of the rod-shaped element 8, in a plane parallel to the second panel surface 3 may have a circular shape, a rectangular shape a star shape, an oval shape or a hexagon shape.

A locking of the first panel to the second panel in a second direction which is perpendicular to the first panel surface may be obtained by cooperating locking surfaces between the insertion groove 7 and the rod-shaped element 8.

A locking of the first panel to the second panel in a third direction which is perpendicular to the first direction and the second direction surface may be obtained by cooperating locking surfaces between the insertion groove 7 and the rod-shaped element 8.

A second cross cut of the insertion groove 7, in a plane parallel to the second panel surface, preferably has a shape that matches a first cross cut of the rod-shaped element 8, in a plane parallel to the second panel surface. An advantage of this may be that an improved locking of the first panel to the second panel in the second direction is obtained and/or an improved locking of the first panel to the second panel in a third direction is obtained.

Figure 3:
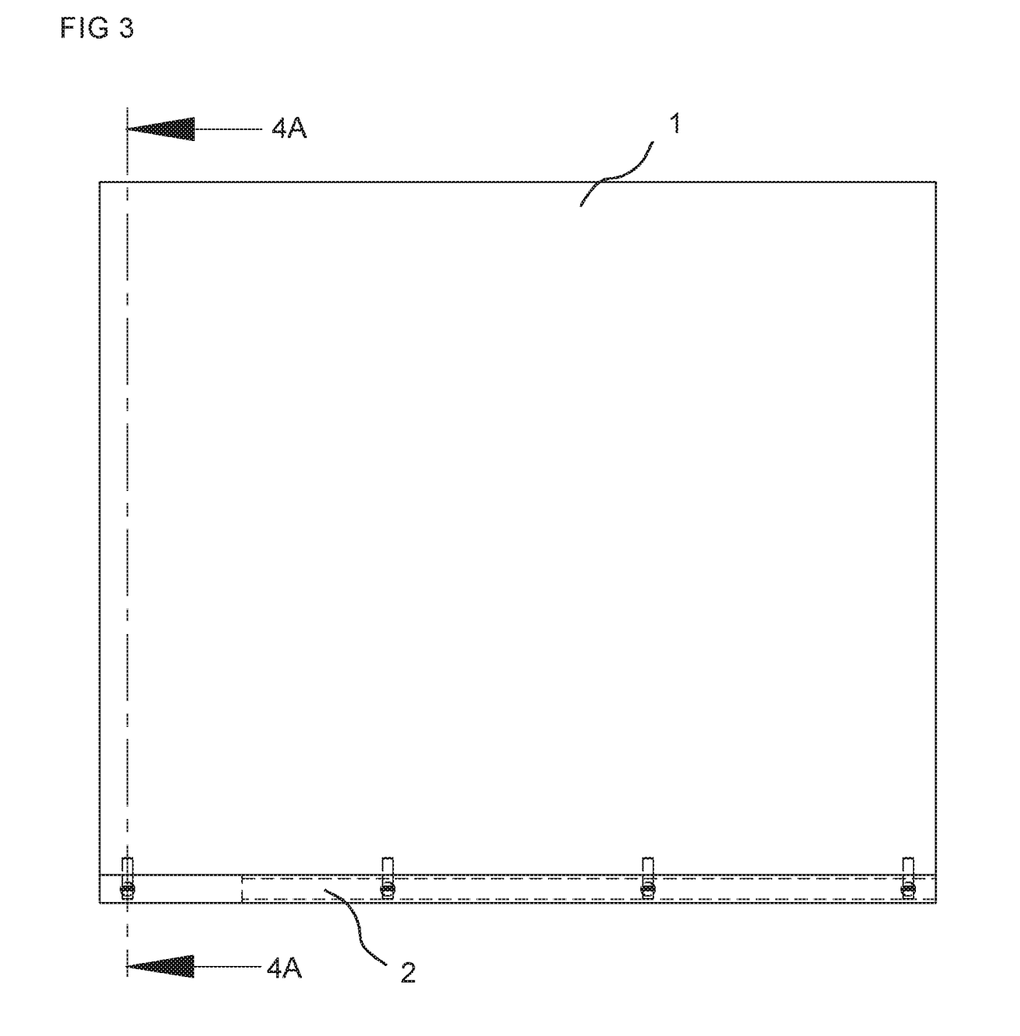
FIG. 3 shows an embodiment of the first panel and the second panel in a locked position according to an embodiment of the invention.

FIG. 3 shows a side view of the first panel and the second panel in the locked position.

Figure 4A:
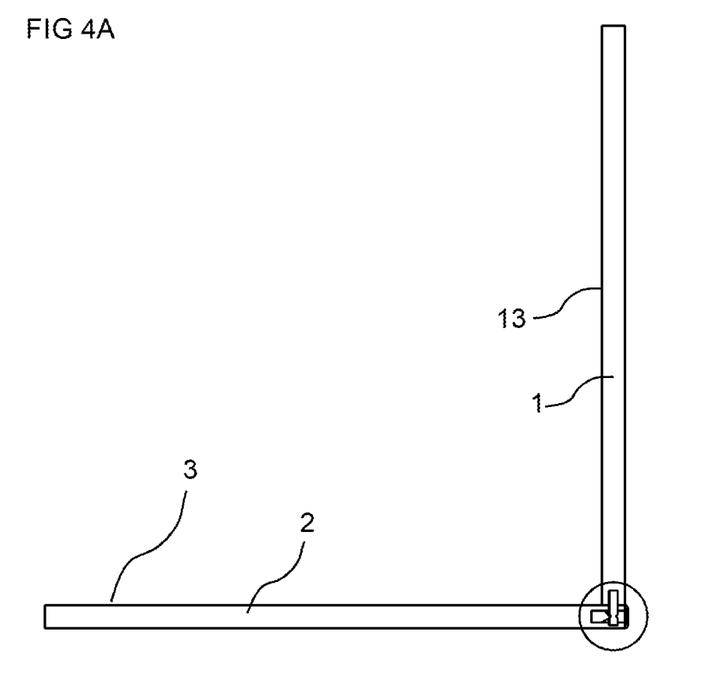
FIG. 4A shows a cross section of an embodiment of the first panel and the second panel in a locked position according to an embodiment of the invention.
Figure 4B:
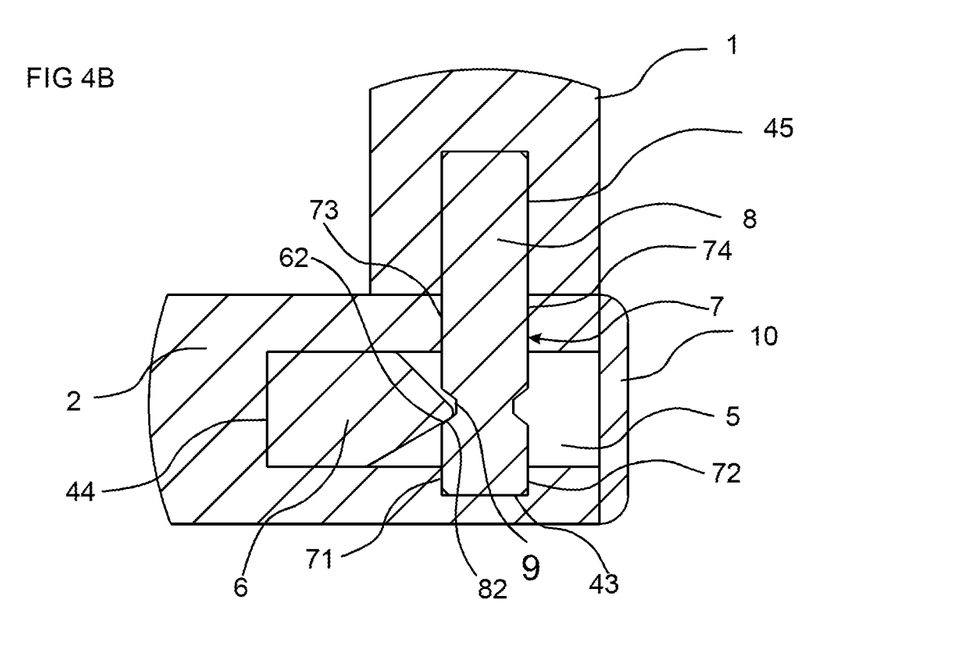
FIG. 4B shows an enlargement of a part of the embodiment shown in FIG. 4A.

FIG. 4A shows a cross cut, at the line indicated by 4A in FIG. 3; of the first panel and the second panel in the locked position. FIG. 4B show an enlargement of the encircled area indicated in FIG. 4A. The insertion groove may extend from the second panel surface 3 to the edge groove 5.

A locking surface 62 of the flexible tongue 6 may cooperate with a locking surface 82 of the recess 9 for the locking of the first panel to the second.

The insertion groove may a bottom-ended groove, such as a bottom ended drill hole, comprising a bottom surface 43 which is positioned at a distance from the edge groove 5.

The insertion groove may have a first part on a first side of the edge groove 5 and a second part on a second side of the edge groove 5, wherein the second part comprises a bottom surface 43 and side walls 71, 72, wherein, in a locked position, the rod-shaped element passes through the first part of the insertion groove, through the edge groove 5 and into the second part of the insertion groove.

The rod-shaped element 8 may be configured to cooperate, for the locking in the second direction, with the side walls 71, 72 of the second part of the insertion groove.

The rod-shaped element 8 may be configured to cooperate, in a locked position, with the bottom surface 43.

The first part may comprise side walls 73, 74, wherein the rod-shaped element 8 may be configured to cooperate, for the locking in the second direction, with side walls 73, 74 of the first part.

The edge groove may extend from the second edge surface 4 to the insertion groove 7.

The edge groove 5 may be a bottom-ended groove, comprising a bottom surface 44 which is positioned at a distance from the insertion groove 7.

The flexible tongue 6 may be arranged at the bottom surface 44 of the edge groove 5.

The flexible tongue may be arranged between the recess 9 and the bottom surface 44 of the edge groove in the locked position.

The rod-shaped element 8 may be configured to be attached in an attachment groove 45 in the first edge surface 12.

The rod-shaped element 8 may be configured to be glued in the attachment groove 45 in the first edge surface 12.

The rod-shaped element 8 may be configured to be locked in the attachment groove 45 by a friction connection or by a mechanically connection, such as threads or by a locking element, such as a barb.

The second edge surface 4 may be essentially perpendicular to the second panel surface 3.

A second embodiment of the invention is shown in FIGS. 5A-8B including a set comprising a first panel 1, a second panel 2 and a mechanical locking device for locking the first panel to the second panel. The embodiment comprises an embodiment of the edge groove 5 which is a longitudinal groove that extends in a longitudinal direction of the second edge surface 4.

Figures 5A, 5B:
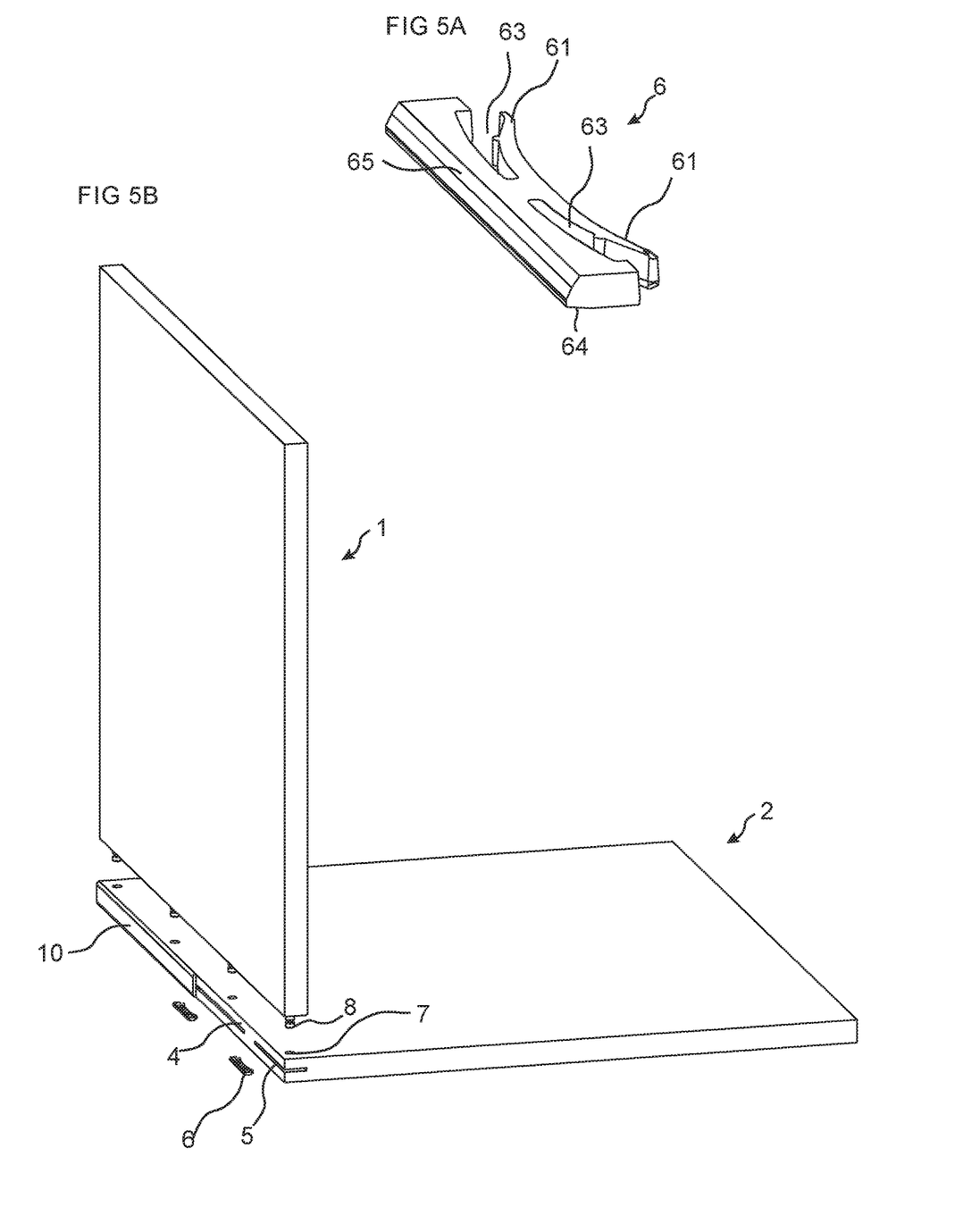
FIG. 5A shows an embodiment of the flexible tongue according to an embodiment of the invention.
FIG. 5B shows a 3D-view of an embodiment of the invention during assembling.

FIG. 5B shows the second embodiment in a 3D view during assembling. The first panel may be assembled by displacing the first panel relative the second panel in a direction which is perpendicular to the second panel surface 3. The mechanical locking device may be configured to automatically lock the first panel 1 to the second panel 2 when the rod-shaped element 8 is inserted into the insertion groove 7 and the first edge surface 12 is arranged against second panel surface 3.

The insertion groove 7 may be formed in the second panel surface 3 and in a core of the second panel 2.

The second panel surface 3 may comprise a decorative layer and the insertion groove may extend though the decorative layer.

The insertion groove may be formed by mechanical cutting, such as milling or sawing.

An edge element 10, such as an edge band, is preferably attached to the second edge for covering the edge groove and for enforcing the second edge 4. The edge element 10 may be glued to the second edge or attached by a mechanical locking device, which may comprise a part that protrudes from the edge element and is configured to be inserted into the edge groove 5. The part may be attached to the edge groove by friction. The edge element is in FIG. 5B partly removed in order to visualize the flexible tongue 6 and the edge groove 5. The flexible tongue 6 is shown before it is positioned in the edge groove 5.

The first panel 1 and the rod-shaped element 8 of the second embodiment may be identical to the first panel 1 and the rod-shaped element 8, respectively, of the first embodiment.

An embodiment of the flexible tongue 6 is shown in FIG. 5A in a 3D view. The flexible tongue 6 may comprise a first essentially straight edge and a second edge which comprises a bendable part 61, preferably a first bendable part and a second bendable part. The first edge is preferably configured to cooperate with the recess 9 of the rod-shaped element 8. The flexible tongue preferably comprises a recess 63 at each of said bendable parts. An advantage with this embodiment of the flexible tongue is that a stronger spring force may be obtained which may provide a stronger locking. A disadvantage for some embodiments of the second panel is that the size of the edge groove may have to be larger which may weaken the second edge 4 of the second panel 2.

The first essentially edge may comprise a first bevel 65 which configured to cooperate with the rod-shaped element 8 during assembling and/or a second bevel 64 which is configured to cooperate with the recess for the locking.

Figure 6:
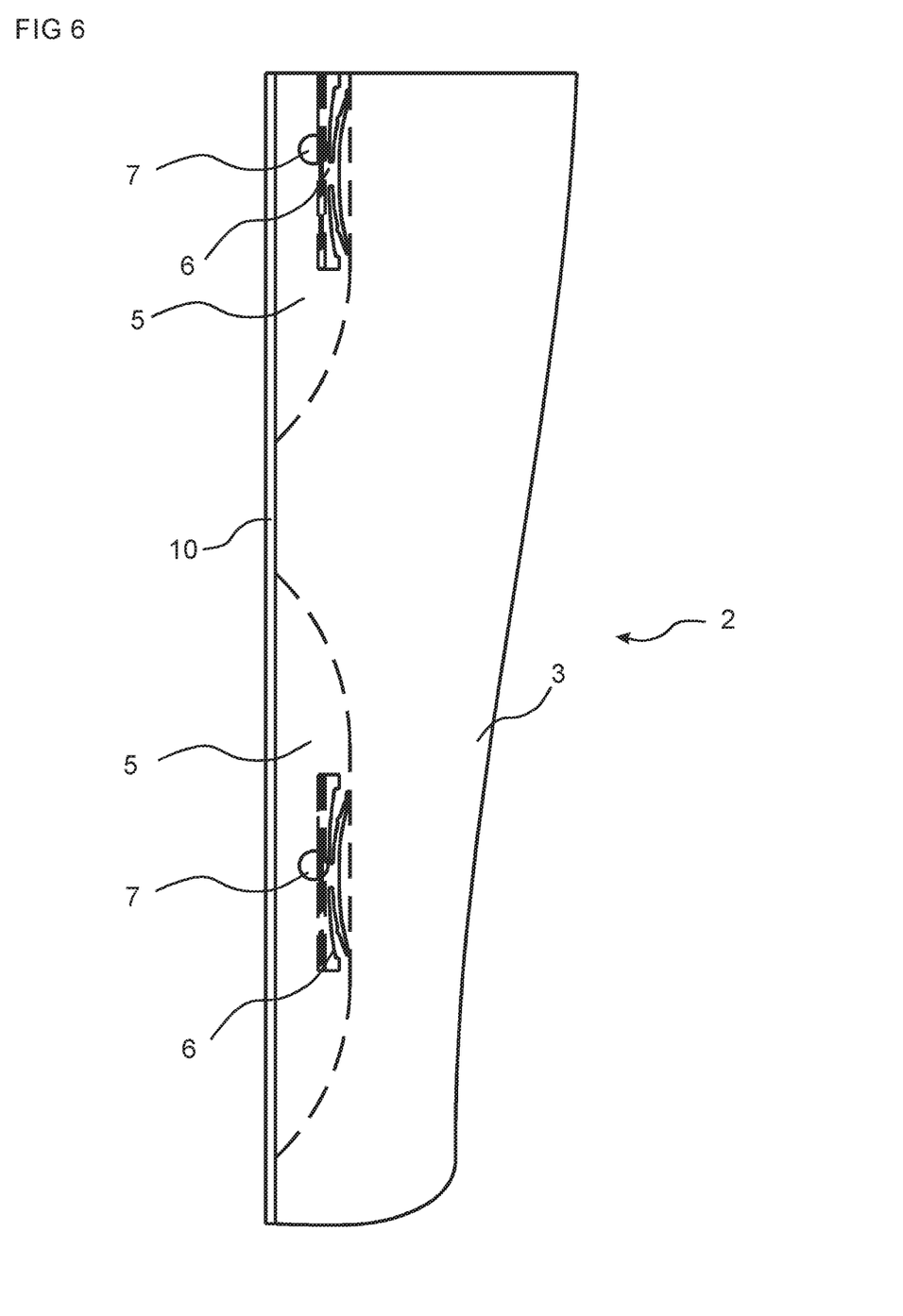
FIG. 6 shows an embodiment of the second panel according to an embodiment of the invention.

FIG. 6 shows a top view of a part of the second panel 2. The second panel may comprise two or more of said edge groove 5. The edge grooves are hidden and the outline of said edge groove is indicated by a broken line. The bendable part of the flexible tongue may cooperate with a bottom surface of the edge groove 5.

Figure 7A:
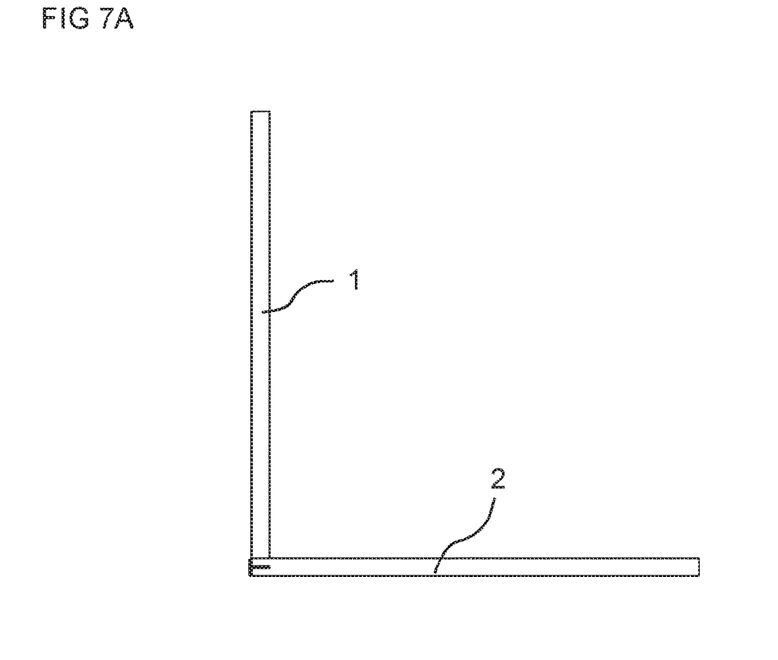
FIGS. 7A-7B show side views of an embodiment of the first panel and the second panel in a locked position according to an embodiment of the invention
Figure 7B:
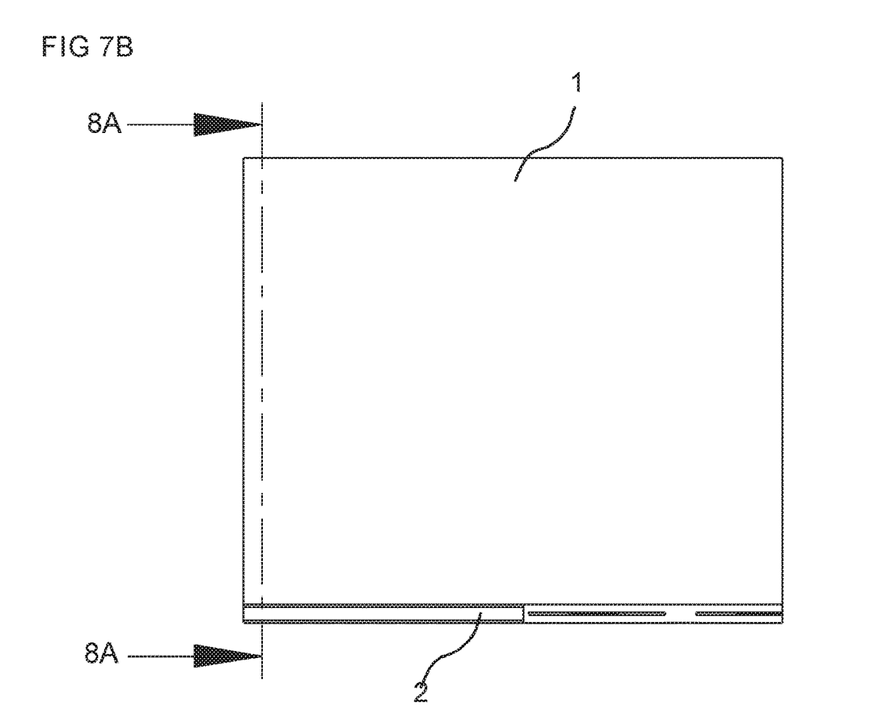

FIG. 7A shows a first side view and FIG. 7B a second side view of the first panel 1 and the second panel 2 in a locked position.

Figure 8A:
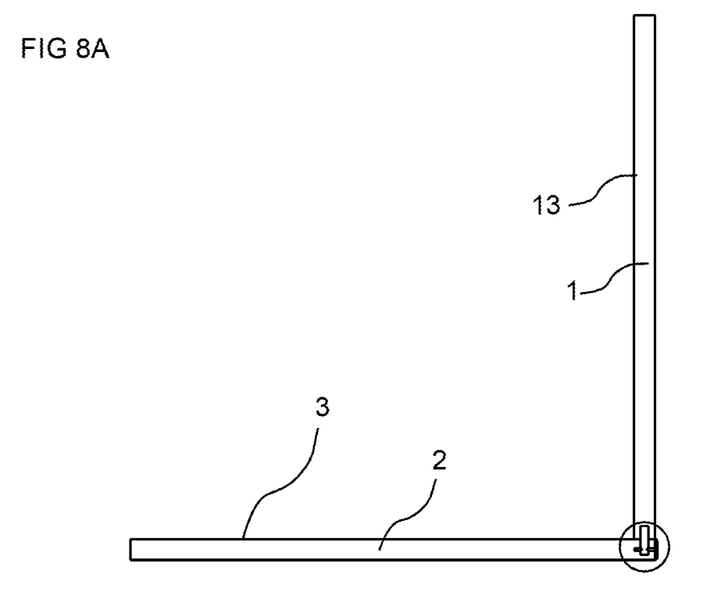
FIG. 8A shows a cross section of an embodiment of the first panel and the second panel in a locked position according to an embodiment of the invention.
Figure 8B:
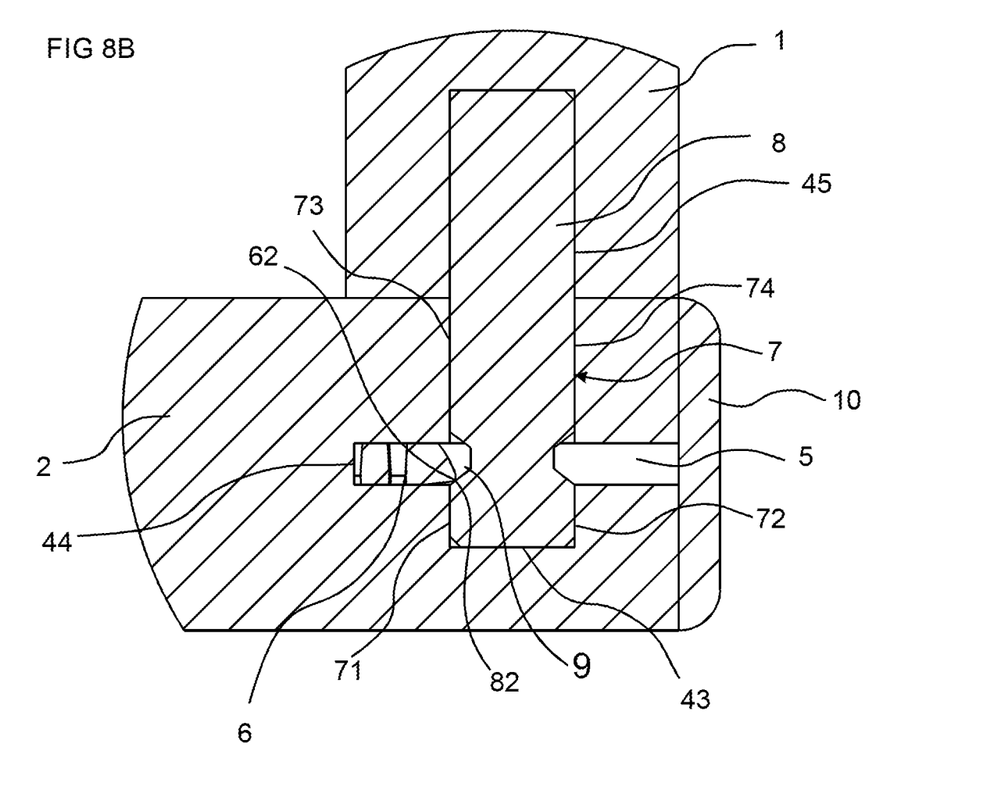
FIG. 8B shows an enlargement of a part of the embodiment shown in FIG. 8A.

FIG. 8A shows a cross cut, at the line indicated by 8A in FIG. 7B; of the first panel 1 and the second panel 2 in the locked position. FIG. 8B show an enlargement of the encircled area indicated in FIG. 8A. The insertion groove may extend from the second panel surface 3 to the edge groove 5.

A locking surface 62 of the flexible tongue 6 may cooperate with a locking surface 82 of the recess 9 for the locking of the first panel to the second.

The insertion groove may a bottom-ended groove, such as a bottom ended drill hole, comprising a bottom surface 43 which is positioned at a distance from the edge groove 5.

The insertion groove may have a first part on a first side of the edge groove 5 and a second part on a second side of the edge groove 5, wherein the second part comprises a bottom surface 43 and side walls 71, 72, wherein, in a locked position, the rod-shaped element passes through the first part of the insertion groove, through the edge groove 5 and into the second part of the insertion groove.

The rod-shaped element 8 may be configured to cooperate, for the locking in the second direction, with the side walls 71, 72 of the second part of the insertion groove.

The rod-shaped element 8 may be configured to cooperate, in a locked position, with the bottom surface 43.

The first part may comprise side walls 73, 74, wherein the rod-shaped element 8 may be configured to cooperate, for the locking in the second direction, with side walls 73, 74 of the first part.

The edge groove may extend from the second edge surface 4 to the insertion groove 7.

The edge groove 5 may comprise a first surface, an opposite second surface and a bottom surface 44 extending between the first surface and the opposite second surface.

The bottom surface may be positioned at a distance from the insertion groove 7.

The bendable part 61 of the flexible tongue 6 may be arranged at the bottom surface 44 of the edge groove 5.

The flexible tongue 6 may be arranged at the bottom surface 44 of the edge groove 5.

The flexible tongue may be arranged between the recess 9 and the bottom surface 44 of the edge groove in the locked position.

A part of the flexible tongue 6 may be configured to be displaced against a surface of the edge groove 5, such as the first surface and/or the second surface.

The rod-shaped element 8 may be configured to be attached in an attachment groove 45 in the first edge surface 12.

The rod-shaped element 8 may be configured to be glued in the attachment groove 45 in the first edge surface 12.

The rod-shaped element 8 may be configured to be locked in the attachment groove 45 by a friction connection or by a mechanically connection, such as threads or by a locking element, such as a barb.

The second edge surface 4 may be essentially perpendicular to the second panel surface 3. The flexible tongue 6 may be according to the flexible tongue described and shown in FIGS. 2A-2F in WO2015/105449. FIGS. 2A-2F and the related disclosure from page 6, line 15 to page 7, line 2, in WO2015/105449 are hereby expressly incorporated by reference herein.

The core of the first panel 1 and/or of the second panel 2 may be a wood-based core, preferably made of MDF, HDF, OSB, WPC, plywood or particleboard. The core may also be a plastic core comprising thermosetting plastic or thermoplastic e.g. vinyl, PVC, PU or PET.

The plastic core may comprise fillers.

The first panel 1 and/or the second panel 2 may also be of solid wood.

The first panel 1 and/or the second panel 2 may be provided with a decorative layer, such as a foil or a veneer, on one or more surfaces.

Embodiments

1. A set comprising a first panel (1), a second panel (2) and a mechanical locking device for locking the first panel to the second panel, wherein the first panel (1) comprises a first edge surface (12) and a first panel surface (13), wherein the second panel (2) comprises a second edge surface (4) and a second panel surface (3), wherein the first edge surface (12) is facing the second panel surface (3) in a locked position of the first and the second panel, characterized in that the mechanical locking device comprises a rod-shaped element (8) at the first edge surface (12) and an insertion groove (7) at the second panel surface (3), that the mechanical locking device comprises an edge groove (5) at the second edge surface (4) and a flexible tongue (6) positioned in the edge groove (5), that the rod-shaped element (8) comprises a recess (9), that the rod-shaped element (8) is configured to be inserted into the insertion groove (7), and that the flexible tongue (6) is configured to cooperate with the recess (9) for a locking of the first panel (1) to the second panel (2) in a first direction which is perpendicular to the second panel surface (3).

2. The set as in embodiment 1, wherein the insertion groove (7) extends from the second panel surface (3) to the edge groove (5).

3. The set as in embodiments 1 or 2, wherein the mechanical locking device is configured to automatically lock the first panel (1) to the second panel (2) when the rod-shaped element (8) is inserted into the insertion groove (7) and the first edge surface (12) is arranged against second panel surface (3).

4. The set as in any one of the embodiments 1-3, wherein the rod-shaped element (8) has a longitudinal shape with a length direction which is parallel to the first panel surface.

5. The set as in any one of the embodiments 1-4, wherein a first crosscut of the rod-shaped element (8), in a plane parallel to the second panel surface (3) has a circular shape or a rectangular shape.

6. The set as in any one of the embodiments 1-5, wherein a second cross cut of the insertion groove (7), in a plane parallel to the second panel surface, has a shape that matches a first cross cut of the rod-shaped element (8), in a plane parallel to the second panel surface.

7. The set as in any one of the embodiments 1-6, wherein the insertion groove is a bottom-ended groove, such as a bottom ended drill hole, comprising a bottom surface (43) which is positioned at a distance from the edge groove (5).

8. The set as in embodiment 7, wherein the insertion groove has a first part on a first side of the edge groove (5) and a second part on a second side of the edge groove (5), wherein the second part comprises the bottom surface (43) and side walls (71, 72), wherein, in a locked position, the rod-shaped element passes through the first part of the insertion groove, through the edge groove (5) and into the second part of the insertion groove.

9. The set as in embodiment 8, wherein the rod-shaped element (8) is configured to cooperate with the side walls (71, 72) of the second part of the insertion groove.

10. The set as in embodiments 8 or 9, wherein the rod-shaped element (8) is configured to cooperate with the bottom surface (43).

11. The set as in any one of the embodiments 1-10, wherein the first edge surface (12) comprises two or more of said rod shaped element and the second panel surface (3) comprises two or more of said insertion groove (7), preferably arranged linearly, wherein each of the rod-shaped elements is configured to be inserted into one of the insertion grooves.

12. The set as in any one of the embodiments 1-11, wherein the edge groove (5) comprises a circular cross section.

13. The set as in any one of embodiments 1-11, wherein the edge groove (5) is a longitudinal groove that extends in a longitudinal direction of the second edge surface (4).

14. The set as in any one of the embodiments 1-13, wherein the edge groove extends from the second edge surface (4) to the insertion groove (7).

15. The set as in any one of the embodiments 1-14, wherein the edge groove (5) is a bottom-ended groove, comprising a bottom surface (44) which is positioned at a distance from the insertion groove (7).

16. The set as in embodiment 15, wherein the flexible tongue (6) is arranged at the bottom surface (44) of the edge groove (5).

17. The set as in embodiments 15 or 16, wherein the flexible tongue is arranged between the recess (9) and the bottom surface (44) of the edge groove in the locked position.

18. The set as in any one of the embodiments 16-17, wherein the rod-shaped element (8) is configured to be attached in an attachment groove (45) in the first edge surface (12).

19. The set as in any one of the embodiments 1-18, wherein the second edge surface (4) is essentially perpendicular to the second panel surface (3).

The invention claimed is:

1. A set comprising a first panel, a second panel and a mechanical locking device for locking the first panel to the second panel, wherein the first panel comprises a first edge surface and a first panel surface, wherein the second panel comprises a second edge surface and a second panel surface, wherein the first edge surface is facing the second panel surface in a locked position of the first and second panels, wherein: the mechanical locking device comprises a cylindrical rod-shaped element at the first edge surface and a cylindrical insertion groove at the second panel surface, the mechanical locking device comprises an edge groove at the second edge surface and a longitudinal flexible tongue positioned in the edge groove and extending transversely to the cylindrical insertion groove, the edge groove being a longitudinal groove that extends in a longitudinal direction of the second edge surface, and the edge groove extending from the second edge surface to the insertion groove, the rod-shaped element comprises a recess, the rod-shaped element is configured to be inserted into the insertion groove, and the flexible tongue is configured to cooperate with the recess for a locking of the first panel to the second panel in a first direction which is perpendicular to the second panel surface.

2. The set as claimed in claim 1, wherein the insertion groove extends from the second panel surface to the edge groove.

3. The set as claimed in claim 1, wherein the mechanical locking device is configured to automatically lock the first panel to the second panel when the rod-shaped element is inserted into the insertion groove and the first edge surface is arranged against the second panel surface.

4. The set as claimed in claim 1, wherein the rod-shaped element has a longitudinal shape with a length direction which is parallel to the first panel surface.

5. The set as claimed in claim 1, wherein a second cross cut of the insertion groove, in a plane parallel to the second panel surface, has a shape that matches a first cross cut of the rod-shaped element, in a plane parallel to the second panel surface.

6. The set as claimed in claim 1, wherein the insertion groove is a bottom-ended groove comprising a bottom surface which is positioned at a distance from the edge groove.

7. The set as claimed in claim 6, wherein the insertion groove has a first part on a first side of the edge groove and a second part on a second side of the edge groove, wherein the second part comprises the bottom surface and side walls, wherein, in a locked position, the rod-shaped element passes through the first part of the insertion groove, through the edge groove and into the second part of the insertion groove.

8. The set as claimed in claim 7, wherein the rod-shaped element is configured to cooperate with the side walls of the second part of the insertion groove.

9. The set as claimed in claim 7, wherein the rod-shaped element is configured to cooperate with the bottom surface.

10. The set as claimed in claim 6, wherein the insertion groove is a bottom-ended drill hole.

11. The set as claimed in claim 1, wherein the first edge surface comprises two or more of said rod shaped element and the second panel surface comprises two or more of said insertion groove, wherein each of the rod-shaped elements is configured to be inserted into one of the insertion grooves.

12. The set as claimed in claim 11, wherein the two or more of said insertion groove are arranged linearly.

13. The set as claimed in claim 1, wherein the edge groove is a bottom-ended groove, comprising a bottom surface which is positioned at a distance from the insertion groove.

14. The set as claimed in claim 13, wherein the flexible tongue is arranged at the bottom surface of the edge groove.

15. The set as claimed in claim 14, wherein the rod-shaped element is configured to be attached in an attachment groove in the first edge surface.

16. The set as claimed in claim 13, wherein the flexible tongue is arranged between the recess and the bottom surface of the edge groove in the locked position.

17. The set as claimed in claim 1, wherein the second edge surface is essentially perpendicular to the second panel surface.

18. A set comprising a first panel, a second panel and a mechanical locking device for locking the first panel to the second panel, wherein the first panel comprises a first edge surface and a first panel surface, wherein the second panel comprises a second edge surface and a second panel surface, wherein the first edge surface is facing the second panel surface in a locked position of the first and second panels, wherein: the mechanical locking device comprises a cylindrical rod-shaped element at the first edge surface and a cylindrical insertion groove at the second panel surface, the mechanical locking device comprises an edge groove at the second edge surface and a longitudinal flexible tongue positioned in the edge groove and extending transversely to the cylindrical insertion groove, the edge groove being a longitudinal groove that extends in a longitudinal direction of the second edge surface, the rod-shaped element comprises a recess, the rod-shaped element has a longitudinal shape with a length direction which is transverse to the first edge surface and to the second panel surface in the locked position of the first and second panels, the rod-shaped element is configured to be inserted into the insertion groove, and the flexible tongue is configured to cooperate with the recess for a locking of the first panel to the second panel in a first direction which is perpendicular to the second panel surface.

* * * * *